United States Patent Office 3,516,533
Patented June 23, 1970

3,516,533
MACHINE FOR HANDLING AN ELONGATED WORKPIECE TO ENABLE MACHINING OPERATIONS THEREON
Fritz Schenkel, Wangen, Olten, Switzerland, and Ernst von Hayn, Butzbach, Oberhessen, and Helmut Andres, Espa, near Butzbach, Germany, assignors to Pintsch Bamag Aktiengesellschaft, Berlin and Butzbach, Oberhessen, Germany
Filed Mar. 8, 1968, Ser. No. 711,634
Claims priority, application Germany, Mar. 8, 1967, P 41,575
Int. Cl. B65g 15/06
U.S. Cl. 198—179        10 Claims

ABSTRACT OF THE DISCLOSURE

A machine in which a workpiece such as a railroad rail, or the like, is transported longitudinally through a work zone while being clamped between driver dogs which are carried by a chain and are slidable in the chain to be acted on by guide members to be forced into contact with the rails.

BRIEF SUMMARY OF THE INVENTION

This invention relates to a machine for operating on an elongated workpiece such as a railroad rail or the like.

In particular, the invention is concerned with the handling and transport of the workpiece through a work zone.

Conventionally, there have been employed moving work tables for machining very long profiled workpieces in the longitudinal direction, for instance the head profile of rails, by honing, milling or grinding. However, such moving work tables are unnecessarily expensive and are also unsuitable for long rails.

A short, tableless honing machine is known for deburring worn rails, through which the rails are moved without firm clamping by means of driven conical friction rolls which simultaneously offer support to the rail, said rolls reaching from both sides into the recesses of the rail and rolling against the underside of the rail head and the upperside of the rail foot. Since these bearing surfaces of the rails have uneven mass and irregularities, and since old rails may be rusty and dirty, this known honing machine permits rough deburring, but not a precise machining and overhauling of the rail head.

An object of the present invention is to overcome the above deficiencies and according to the invention there is provided a machine tool for fabricating railroad rails and other similar long work pieces by honing, milling or grinding, which is essentially characterized by the provision of a driven endless chain for moving the workpiece, the links of said chain being provided with rodlike driver dogs, which are slidingly fastened to the respective chain links for clamping the workpiece therebetween, and which carry pressure rollers on their outer ends, which in the work zone, run on rectilinear guide rails extending parallel to the chain in such a manner, that the innermost ends of the dogs are pressed against the workpiece. Moreover, the dogs are provided with additional guide rollers, which in the path before and after the work zone pass on further guide rails in such a manner that the workpiece is engaged by the dogs before the first guide rollers have reached the rectilinear guide rails, and are released by the dogs as soon as the guide rollers have passed the rectilinear guide rails. For this purpose it is advantageous to make the dogs on one side of the workpiece rigid, and axially resilient on the other side.

In this manner a machine of relatively short length is obtained, in which the entering work piece is received and engaged by the links of the endless chain and again released upon leaving the machine, whereas, during its passage through the work zone, the rail or similar workpiece rests firmly on the chain links and is securely clamped between the pairs of drive dogs. Thus the chain not only serves as a conveyor, but it simultaneously assumes the role of the machine table with its chucking elements in a conventional honing machine in resisting all component forces of the cuting pressure and in transmitting the feed force to the workpiece. Moreover, the chain with its multitude of pairs of drive dogs is excellently suitable for appropriately aligning the workpiece for its machining operation, i.e. to bring it into and to maintain it in an absolutely horizontal position.

Chain conveyors for rails and pipes are known in which the rail is held by groups of individual magnets interconnected to form a chain, or others where the pipe is clamped between two chains. It is also known to move short elements continuously through a fabricating machine (DDR Pat. 10,972, U.S. Pat. 2,303,587, British Pat. 130,013, U.S. Pat. 2,479,026, and British Pat. 392,692). However, none of these known arrangements is suitable for absorbing the cutting pressures or transmitting the feed forces in the machining of rails, sometime requiring repeated reciprocating movements, nor for attaining the desired degree of precision in the cut, as is possible with the machine according to the present invention.

DETAILED DESCRIPTION

Figure 1:
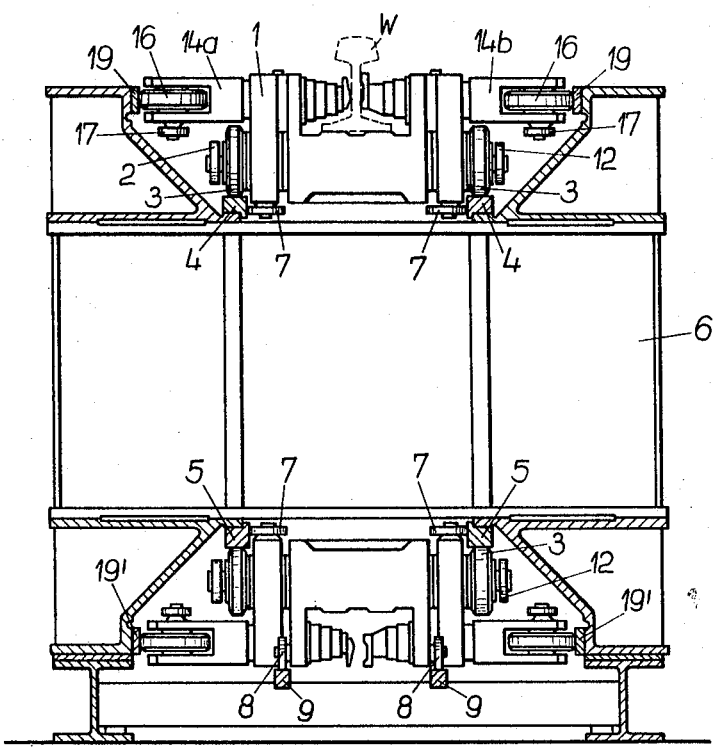
FIG. 1 is a cross-section through the bed of a machine according to the invention with an endless chain serving for supporting and feeding the work.

In the drawing there is seen a chain composed of links 1 joined together by pivot bolts 2, the ends of which carry support rollers 3 which run on upper and lower guide members 4 and 5 integral with the frame 6 of the machine. For the purpose of lateral guidance, each chain link is provided with two guide rollers 7, which run along the inner face of the members 4 and 5. Two smaller support rollers 8 and guides 9 serve for supporting the chin links on their return run at the bottom.

Figure 3:
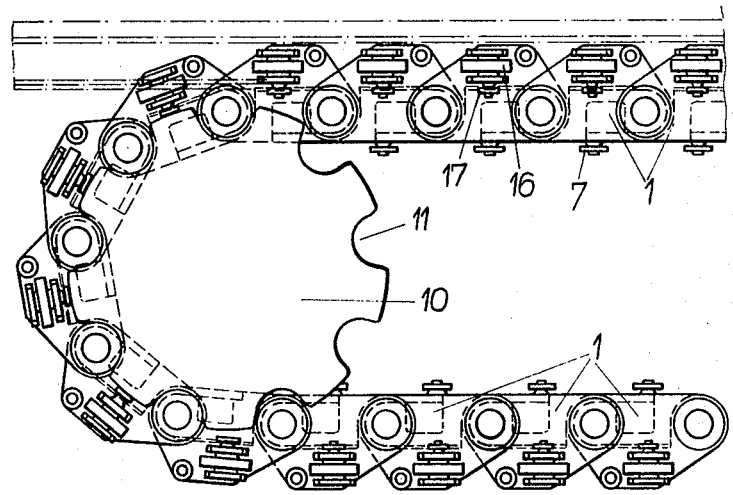
FIG. 3 is a side view of the chain and a reversing wheel at one end of the machine.

The chain is endless and passes around two reversing wheels 10 (only one of which is shown in FIG. 3). One of the two reversing wheels 10 is driven in rotation by a suitable prime mover (not shown) to drive the chain. Each wheel has semi-circular cutout recesses 11 which receive the support rollers 3. For compensating any inaccuracies of the engagement of rollers 3 in recesses 11, additional support rollers 12 are provided on the pivot bolts 2, which during the reversal run on circular discs (not shown) concentric with the reversing wheels.

Each chain link is provided with opposed flanks embracing the workpiece and a platform or bridge 13 serving as a support for the workpiece W. Two driver dogs which face each other are supported in each link for engaging the workpiece from both sides in order to feed it through the machine.

The driver dogs essentially consist of rods 14a and 14b slidably supported by a respective chain link for transverse movement, which rods at their inner ends carry engaging dogs 15a and 15b respectively, and at their outer ends carry a pressure roller 16 and a guide roller 17.

Figure 4:
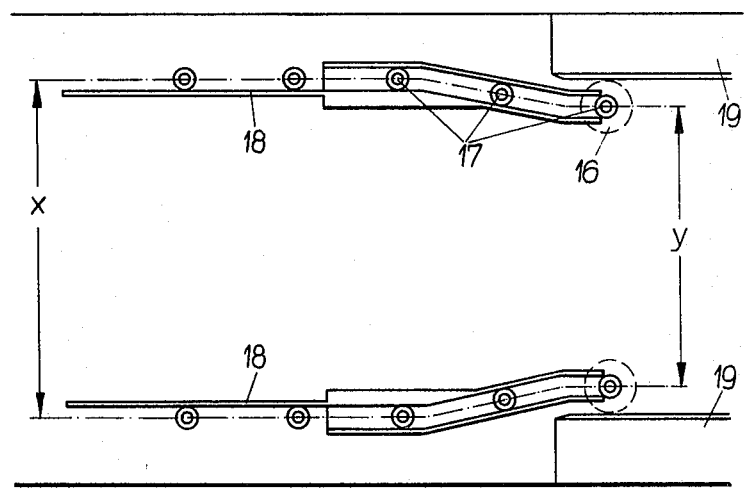
FIG. 4 a plan view of the guide profiles at the end of the machine.

The guide rollers 17 bear against guide rails 18 as soon as their associated chain link has passed from the reversing wheel and travel into the upper run of the chain (see FIGS. 3 and 4). The guide rollers 17 are moved laterally towards each other by the guide rails 18 from a distance x to a distance y, whereby the engaging dogs 15a, 15b are brought in contact with the workpiece W. This permits the pressure rollers 16 to run onto the rectilinear guide rails 19, causing the engaging dogs to be firmly pressed against the workpiece, which thus becomes securely clamped between said engaging dogs and are conveyed through the work zone.

At the end of the work zone the pressure rollers 16 are freed from the rectilinear guide rails, and the guide rollers 17 are engaged by guide rails of a configuration and arrangement symmetrical with the guide rails 18, whereby the driver dogs are caused to release the workpiece and are pulled farther apart from each other. The chain can now travel without any hindrance from the workpiece, i.e. in the example shown, without interference with the base flange of the fabricated rail, toward the reversing wheel 10 in order to travel to the return run of the chain at the bottom.

Lower guide rails 18', 19' are provided at the bottom run of the chain corresponding to the upper guide rails 18, 19, in order to reduce the distance between the driver dogs to the value y on the return run of the chain in order to economize on floor space.

Figure 2:
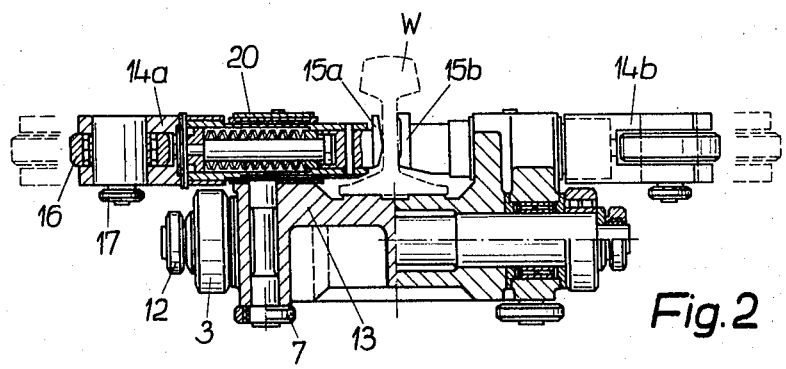
FIG. 2 is a cross-section of the chain alone on a larger scale.

For securely gripping the workpiece and for centering and aligning it precisely on its passage through the machine, it is advantageous to make the driver dogs on one side of the workpiece rigid, and those on the opposite side of the workpiece resilient. FIG. 2 shows a section of a resilient driver dog rod, which for this purpose contains a sturdy spring 20, which is interposed between the engaging dog and the rod body carrying the pressure roller.

What is claimed is:

1. A machine for operating on an elongated workpiece, said machine comprising conveyor means for engaging and supporting a workpiece while transporting the workpiece longitudinally through a work zone in which the workpiece is operated on, said conveyor means including a chain with a plurality of links connected together and each including opposed flanks for embracing said workpiece and a transverse bridge for supporting said workpiece, engager means slidably carried by said flanks of the links of the chain for transverse movement, and guide means positioned adjacent said chain for contacting the engager means to cause the engager means to clamp the workpiece therebetween and transport the workpiece with the chain.

2. A machine as claimed in claim 1 wherein said engager means comprises a pair of rods slidably supported by the flanks of an associated link for transverse movement, each rod having inner and outer ends and a roller on the outer end, said guide means including guide rails adjacent said links for engaging the rollers on the outer ends of the rods to urge the inner ends of the rods against the workpiece.

3. A machine as claimed in claim 2 wherein said guide rails extend parallel to the chain.

4. A machine as claimed in claim 3 comprising an additional roller on each rod at the outer end thereof, and further guide rails located before and after the first said guide rails, the additional rollers being engageable with the further guide rails to urge the rods into engagement with the workpiece prior to the arrival of the first said rollers at the first said guide means and to free the rods from the workpiece after the first said rollers have reached the end of the guide means.

5. A machine as claimed in claim 4 wherein said further guide rails include a portion which is inclined relative to the longitudinal path of travel of the workpiece.

6. A machine as claimed in claim 2 wherein said rods are laterally aligned on opposite sides of the workpiece, the rods on one side of the workpiece being constituted as rigid members whereas the rods on the other side of the workpiece have axial resilience.

7. A machine as claimed in claim 6 wherein said rods on the other side of the workpiece each comprises first and second members which are slidably engaged and spring means between said first and second members.

8. A machine as claimed in claim 1 wherein said chain is endless, said conveyor means comprising sprockets on which the chain travels and has upper and lower runs, the work zone being at the upper run of the chain.

9. A machine as claimed in claim 8 comprising guide means at the lower run of the chains to move the engager means transversely towards one another during travel along said lower run.

10. A machine as claimed in claim 1 wherein said engager means comprises first and second sets of rollers, said guide means comprising a guide rail for each roller, the guide rails and sets of rollers being relatively located such that one guide rail engages one set of rollers to hold the engager means closed while the other guide rail engages the second set or rollers both to hold the engager means open and to close the engager means to produce engagement of the one set of rollers and said one guide rail.

References Cited

UNITED STATES PATENTS

| 1,545,349 | 7/1925 | Riedel | 226—173 |
| 1,921,238 | 8/1933 | Milam | 198—179 |
| 2,974,361 | 3/1961 | Gercke | 226—173 |

FOREIGN PATENTS

| 576,661 | 4/1946 | Great Britain. |

RICHARD E. AEGERTER, Primary Examiner